July 19, 1960
H. TACKE
2,945,991
DEVICE FOR SUPPLYING CURRENT TO
LOAD-LIFTING ELECTROMAGNETS
Filed Nov. 21, 1957
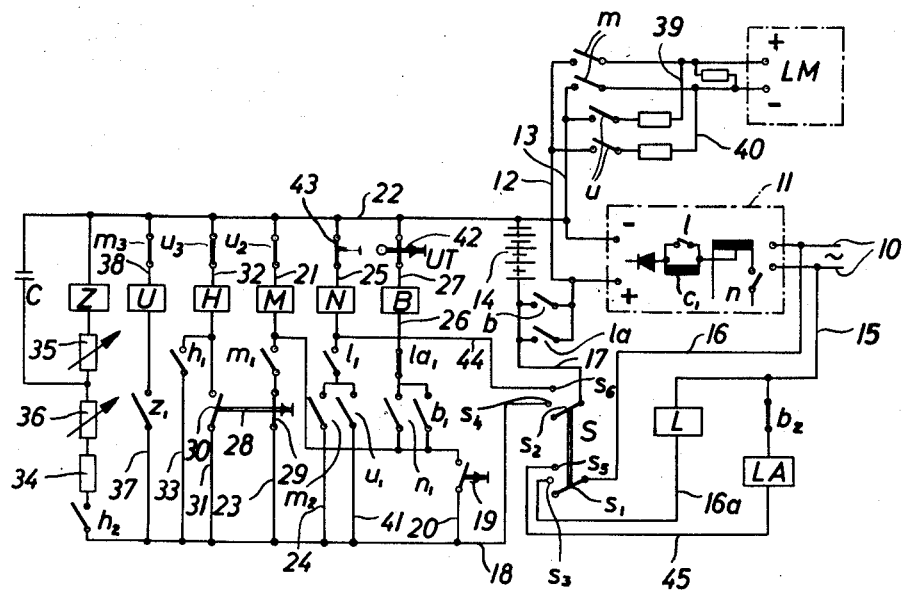
INVENTOR
Herbert Tacke
BY United States Patent Office 2,945,991
Patented July 19, 1960

2,945,991

DEVICE FOR SUPPLYING CURRENT TO LOAD-LIFTING ELECTROMAGNETS

Herbert Tacke, Koln, Germany, assignor to Steinert Elektromagnetbau, Koln, Braunsfeld, Germany, a German firm Filed Nov. 21, 1957, Ser. No. 697,857

Claims priority, application Germany Nov. 29, 1956

11 Claims. (Cl. 317—123)

This invention relates to a device for supplying current to load-lifting magnets, and more specifically to a device supplying current to such magnets from a single or multiphase line by means of rectifiers.

The invention contemplates the use of a battery for supplying current to the magnet in the case of line failure in order to prevent dropping of the load from the magnet in the event of sudden interruption of the line current supply. The use of a battery as a safety device to prevent dropping of the load because of line voltage failure involves a number of difficulties, primarily because of the fact that it is impossible to have the battery connected in the circuit for the magnet by a magnetic switch operated by failure of the line current because the load would be dropped from the magnet during the switching interval in the case of line failure. If the battery is connected in the circuit for the magnet during energization of the latter by the line current, it is necessary to protect the battery from the high no-load voltage of the rectifier, so that the battery must not be connected until the rectifier is under load. In order to prevent discharging of the battery while the magnet is being supplied by the rectifier, the number of cells in the battery has to be selected so as to make the battery voltage correspond to the voltage of the rectifier under load.

Further difficulties are encountered when the magnet is switched off by a so called "tipping method" which provides first for disconnecting the power supply of the rectifier, whereupon the direct current circuit is opened as soon as the direct current has dropped to a predetermined value. The direct current voltage is then reversed for back-magnetization while the direct current circuit is again briefly closed. During this "tipping process," when the power supply is briefly interrupted while the magnet current is still maintained, it is necessary to disconnect the battery because it would otherwise supply the full magnet current and would make "tipping" impossible. The battery must also be disconnected during the reversal of polarity in order to prevent the high disconnecting peak of the magnet voltage of opposite polarity from being applied to the battery.

It is an object of this invention to provide a device for supplying current to load-lifting magnets that overcomes all of the above mentioned difficulties.

In accordance with an aspect of this invention, a device for supplying current to load-lifting magnets comprises a battery for supplying current to the magnet during line failure and a control device supplied with current by the battery, which connects the battery in the magnet circuit after the magnet has been energized, and which keeps the battery in parallel arrangement in the circuit with the rectifier and magnet even during line failure and the magnet current is switched-off. Since power is supplied to the control device by the battery, the position of the control device is maintained during line power failure.

Further, in accordance with an aspect of this invention, when the current to the magnet is switched-off, an additional control device may be actuated which, after a predetermined delay, applies rectifier voltage of reversed polarity to the magnet for a predetermined period.

The above, and other objects, features and advantages of the invention, will be apparent in the following detailed description of an illustrative embodiment thereof which is to be read in connection with the accompanying drawing, wherein the single view is a wiring diagram of a device for supplying current to a load-lifting electromagnet in accordance with the present invention.

Referring to the drawing in detail, it will be seen that the illustrated device for supplying current to a load-lifting electromagnet LM includes a rectifier 11 of conventional construction connected to supply lines 10 carrying single or multiphase alternating current, and which is adapted to rectify such alternating current in order to normally supply rectified current to the electromagnet LM by way of conductors 12 and 13. The illustrated device also includes a battery 14 which is connected across the conductors 12 and 13 in parallel with the rectifier 11 in order to continue the supplying of current to the electromagnet LM in the event that there is a failure in the current supplied through the main lines 10.

The illustrated circuit includes a selector switch S having movable contacts $S_1$ and $S_2$ which are movable together from open positions, as illustrated in the drawing, to alternative closed positions, hereinafter described in detail. A relay L is connected across the main lines 10 by conductors 15 and 16 for energization from the main current supply when the selector switch S is moved to a first operative position wherein the movable contact $S_1$ thereof, which is connected to the conductor 16, engages a fixed contact $S_3$ connected to a conductor $16a$ extending to the relay L. The relay L controls normally opened contacts 1 and $l_1$ which are closed in response to energization of the relay L. The normally opened contact $l_1$ is connected in series with a battery-operated power supply relay N to prepare the energizing circuit for the latter in response to the movement of the selector switch S to its first operative position for supplying current from the battery 14 to the electromagnet LM. A conductor 17 extends from one side of the battery 14 to the movable contact $S_2$ of selector switch S, and a fixed contact $S_4$ engaged by the movable contact $S_2$ when the selector switch is in its first operative position is connected to a conductor 18. A normally open push button switch 19 is interposed in a conductor 20 extending from the conductor 18 to one side of a magnet actuating relay M, while a conductor 21 extends from the relay M to a conductor 22 which is connected to the side of the battery 14 remote from the connection to the conductor 17 and also connected to the conductor 13.

Relay M controls normally opened contacts $m$, $m_1$ and $m_2$ which are closed in response to energization of the relay M. The contacts $m$ are interposed in the conductors 12 and 13, while the contact $m_1$ is interposed in a conductor 23 extending between the relay M and the conductor 18 to form a holding contact for the related relay M. The contact $m_2$ is connected in series with a contact $l_1$ controlled by the relay L in a conductor 24 connected between the conductor 18 and a power supply relay N. The power supply relay N is further connected to the conductor 22 by a conductor 25. Thus, when the selector switch S is moved to its first operative position to engage its movable contacts $S_1$ and $S_2$ with the fixed contacts $S_3$ and $S_4$, respectively, the contact $l_1$ is closed to prepare the energizing circuit for the relay N so that, upon closing of the push button switch 19, to energize the relay M, the closed contact $m_2$ will complete the circuit for energizing the relay N with current from the battery 14.

The relay N controls a normally open contact $n$ which is interposed between the main supply lines 10 and the rectifier 11 so that, upon energization of relay N, contact $n$ is closed to feed the alternating line voltage to the rectifier. Since energizing of relay M also causes closing of contacts $m_1$ and $m$, the closed contact $m_1$ provides an alternative or holding circuit for energizing the relay M following release of the push button switch 19, while the closed contacts $m$ complete the circuit between the rectifier 11 and the electromagnet LM by way of the conductors 12 and 13, and the electromagnet is thereby supplied with direct current from the rectifier.

The relay N further controls a normally opened contact $n_1$ interposed in a conductor 26 extending between a relay B and the conductor 20. It will be seen that the conductor 26 connects to the conductor 20 at a location along the latter between the push button switch 19 and the junction of the conductor 20 with the conductor 23. Further, the junction of the conductor 20 with the conductor 23 is at a location along the latter between the holding contact $m_1$ and the relay M. Thus, following the energization of the relay M, in the manner previously described, current for energizing the relay B is supplied from the battery 14 by way of the conductor 17, switch contacts $S_2$ and $S_4$, the conductor 18, conductor 23, holding contact $m_1$, conductor 20, and conductor 26 having the closed contact $n_1$ therein. The circuit for energizing relay B is completed by a conductor 27 extending from the latter to the conductor 22. The relay B controls a normally open holding contact $b_1$ connected in parallel with the contact $n_1$, and a normally open contact $b$ connected between the conductor 17 and the conductor 12 so that, when the relay B is energized, in the manner previously described, the battery 14 is connected across the conductors 12 and 13 in parallel with the rectifier 11.

A push button shut-off switch 28 is provided with a normally closed contact 29 interposed in the conductor 23 between the contact $m_1$ and the junction with the conductor 18, and also with a normally open contact 30 so that, when the push-button switch 28 is actuated, opening of the contact 29 interrupts the holding circuit of the relay M to cause deenergizing of the latter and consequent opening of the contacts $m$ in the conductors 12 and 13, the contact $m_1$ in the holding circuit of relay M and the contact $m_2$ in the energizing circuit of relay N.

The normally open contact 30 of the shut-off switch 28 is provided for actuating a shut-dash off control device that includes a relay H connected between the conductors 18 and 22 by a conductor 31 having the contact 30 interposed therein and a conductor 32. The relay H has a normally open holding contact $h_1$ and a normally opened contact $h_2$. The holding contact $h_1$ is connected in a conductor 33 in parallel with the contact 30 so that, following closing of the latter to initiate the energization of relay H, the contact $h_1$ will close to maintain the energized condition of the related relay. The contact $h_2$ of the auxiliary relay H is connected in series with a timing relay Z between the conductors 18 and 22, and the latter is provided with predetermined closing and releasing delays by the inclusion of a condenser $c$ and a resistor 34, which delays are adjustable by variable resistors 35 and 36 also interposed in the energizing circuit of relay Z.

The timing relay Z has a normally open contact $z_1$ interposed in a conductor 37 connecting a current or polarity reversing relay U to the conductor 18, and the energizing circuit for the relay U is completed by a conductor 38 extending from such relay to the conductor 22. The reversing relay U has normally open contacts $u$ which are interposed in conductors 39 and 40 which are connected, at their opposite ends, to the conductors 12 and 13 and to the conductors 13 and 12, respectively across the contacts $m$ so that, upon closing of the contacts $u$, the contacts $m$ having been previously opened by deenergizing of the relay M, the polarity of the voltage supplied to the electromagnet LM will be reversed.

The reversing relay U further has a normally open contact $u_1$ interposed in a conductor 41 which is connected between relay N and conductor 18 in parallel with the contact $m_2$ in order to energize the relay N in response to energization of the relay U for effecting closing of the normally open contact $n$ controlled by relay N and interposed between the main supply line 10 and the rectifier 11.

In order to prevent accidental starting of the circuit during the shutting off operation, the reversing relay U further has a normally closed contact $u_2$ interposed in the conductor 21 of the energizing circuit for the relay M, so that, upon energizing of relay U, contact $u_2$ open to avoid energizing of relay M. Relay U also has a normally closed contact $u_3$ interposed in the conductor 32 of the energizing circuit for the auxiliary relay H in order to interrupt energization of the latter upon energizing of the reversing relay U.

In order to permit release of pieces which are not securely grasped by the magnet LM, the circuit embodying this invention further includes a push-button interrupter switch UT having two normally closed contacts 42 and 43 which act in sequence in response to actuation of the push-button switch and which are interposed in the conductors 27 and 25, respectively, of the energizing circuits for the relays B and N. Thus, when the interrupter switch UT is pressed, the relay B is first deenergized, thereby to open the contact $b$ for disconnecting the battery 14 from its parallel connection with the rectifier 11, and then the relay N is deenergized to briefly open the contact $n$ between the supply lines 10 and the rectifier 11 for interrupting the supply of current to the electromagnet so that parts which are insecurely held by the latter may be dropped.

The illustrated embodiment of the invention may be modified by substituting, in place of the push-button interrupter switch UT, a cam switch which permits control of the strength of the magnetic field of the magnet LM so that excess parts which were picked up by the magnet may be dropped again until only the desired parts or pieces are held by the magnet. With such a cam switch, manual turning of the latter will cause initial disconnection of the battery 14 from the conductors 12 and 13, and further turning of the cam switch will introduce resistors, in a step-by-step manner, into the circuit between the rectifier 11 and the electromagnet LM so that the field strength of the magnet will be progressively reduced. After the selected parts have been dropped from the magnet, the hand wheel, or other actuating member, of the cam switch is released and is returned to its initial position, for example, by a suitable return spring, thereby to restore the full current supplied by the rectifier to the electromagnet and to reconnect the battery 14 in parallel with the rectifier.

In accordance with another feature of the present invention, the rectifier 11 may be advantageously employed for charging the battery 14 whenever required. In order to permit such charging of the battery by the rectifier, the selector switch S is provided with additional fixed contacts $s_5$ and $s_6$ engageable by the movable contacts $s_1$ and $s_2$, respectively, in a battery charging position of the selector switch. The fixed contact $s_6$ of the selector switch is connected, by a conductor 44, to the energizing circuit of relay N at a point in that energizing circuit between the contact $l_1$ and the related relay, while the contact $s_5$ of the selector switch connected to the conductor 45 which extends to the conductor 15 and has a battery charging relay LA and a normally closed contact $b_2$ connected in series therein. The normally closed contact $b_2$ is controlled by the relay B and opens in response to energizing of the latter, thereby to prevent energizing of the battery charging relay LA whenever relay B is energized for closing contact $b$ by which the battery 14 is connected to the conductors 12 and 13 for supplying current to the electromagnet.

It will be apparent that, when the selector switch S is in its battery charging position with the movable contacts $s_1$ and $s_2$ engaging the fixed contacts $s_5$ and $s_6$, relay N is energized from the battery 14 by a circuit that includes conductor 17, contacts $s_2$ and $s_6$, and conductors 44, 25 and 22, while relay LA is energized from the supply lines 10 by a circuit that includes conductor 16, contacts $s_1$ and $s_5$, and conductors 45 and 15. Energizing of relay N with the selector switch in its battery charging position causes contact $n$ to close for connecting rectifier 11 to the supply lines 10. In order to connect the battery 14 to the rectifier for charging by the latter, the battery charging relay LA has a normally open contact $la$ connected between the conductors 12 and 17 in parallel with the normally open contact $b$, and the contact $la$ is closed in response to energization of the related relay LA. Further, energizing of the relay B during charging of the battery is prevented by a normally closed contact $la_1$ interposed in the conductor 26 of the energizing circuit for relay B and opened in response to energizing of the relay LA. Such locking of the relays LA and B by the contacts $b_2$ and $la_1$, so that the relays are capable only of being alternatively energized, is advantageous particularly when charging chokes $c_1$ are provided within the circuit of the rectifier 11 so as to be effective only during battery charging and are shorted out by a normally open contact $l$ which is closed by energizing of the the relay L when the selector switch S is in its normal operating position wherein the battery and rectifier both feed current to the electromagnet.

It is further desirable to equip the illustrated circuit with an automatic switch, for example, a "pohler" switch, which automatically interrupts charging of the battery 14 by the rectifier 11 when the battery is fully charged.

The above described arrangement operates as follows:

Initially, the selector switch S is moved from the illustrated lower or off-position to the desired operating for either working of the magnet or battery charging. When the switch S is set in the center position for working of the magnet, the line operated relay L is energized whereas in the uppermost position, for battery charging, the line operated relay LA is energized.

When working the magnet, the selector switch S is set for that condition and the push-button 19 is pressed whereby the battery 14 is made to energize the relay M which is held by means of its contact $m_1$ and which connects the load-lifting magnet LM with the rectifier 11 by means of contacts $m$. The power supply relay N which was prepared for energizing by closing of the contact $l_1$ is cut in by contact $m_2$ of relay M and in turn switches on the line voltage for the rectifier by closing of its contact $n$, and energizes the battery relay B by closing of the contact $n_1$. The battery relay B is held in energized condition by its holding contact $b_1$ cooperating with contact $m_1$ of magnet relay M, and connects the battery with the rectifier and the magnet by means of contact $b$. Thus, the battery is cut in only after the magnet LM has been connected to the rectifier, so that the battery is protected from the high voltage peaks of the unloaded rectifier. If the line voltage should fail while the magnet is connected, relay L is deenergized, and, by opening of its contact $l_1$, deenergizes the power supply relay N. Relays M and B, however, remain energized by current from the battery so that the magnet is supplied with current from the battery 14 during line failure.

Switching-off and casing-off of the load is initiated by actuating push-button switch 28. The normally closed contact 29 opens the holding circuit of relay M, thus deenergizing relay M whose holding contact $m_1$ also disconnects the energizing circuit of B which then loses current. Relay N is disconnected by opening of contacts $m_2$. Further, the contacts $m$ open to disconnect the magnet LM. The normally open contact 30 of the switch 28 furthermore energizes the auxiliary relay H which holds itself in energized condition by its contact $h_1$ and which cuts in the timing relay Z by its normally open contact $h_2$. Relay Z is provided with an adjustable delay device which, in the present case, is set for 0.4 second. Relay Z, by means of its contact $z_1$, energizes the voltage reversing relay U which applies reversed polarity voltage for back magnetization to the magnet LM by means of contacts $u$. The delayed contact of Z is intended to permit decay of the high voltage peak occurring when the magnet is disconnected thereby to prevent application of that high voltage peak to the rectifier. When relay U is cut in, the power supply relay N is simultaneously energized by closing of contact $u_1$. However, relay N cannot energize relay B since relay M is without current so that the battery remains disconnected, and relay M is locked against energizing by the contact $u_2$ of relay U. The rectifier voltage, therefore, is applied to the magnet with reversed polarity. At the same time, the contact $u_3$ disconnects the auxiliary relay H which, in turn, interrupts the energizing circuit of relay Z by opening contact $h_2$. However, relay Z releases only after an adjustable delay, which, in the present case, is set for 1.5 to 2.0 seconds, so that relay U is disconnected by means of opening of contact $z_1$ only after this delay during which the reversed voltage is applied to the magnet. When relay U is deenergized, the reversed voltage is switched off and relay N is disconnected by opening of contact $u_1$. The switching-off process is thus completed and the control returns to its initial condition.

Although an illustrative embodiment of the invention has been described in detail herein with reference to the accompanying drawing, it is to be understood that the invention is not limited to that embodiment, and the various changes and modifications obvious to one skilled in the art may be effected without departing from the scope or spirit of the invention, except as defined in the appended claims.

What is claimed is:

1. In an electrical system for supplying current to a load-lifting electromagnet; the combination of a source of alternating current, a rectifier for receiving alternating current from said source and having an output of rectified current, a first circuit for supplying rectified current from said output of the rectifier to the electromagnet, a battery, a second circuit for connecting said battery to said first circuit in parallel with said rectifier as an emergency supply of current for the electromagnet in the event of a failure in said source, a first relay having normally open contacts interposed in said first circuit which are closed by energization of said first relay, alternative circuits for energizing said first relay from said battery, a manually operable, normally open starting switch in one of said alternative circuits, a normally open holding contact in the other of said alternative circuits which is closed in response to energization of said first relay by operation of said starting switch, a second relay, a circuit for energizing said second relay from said battery and having a normally open contact therein which is closed by energization of said first relay, a third relay, a circuit for energizing said third relay from said battery and having a normally open contact therein closed by energization of said second relay, said third relay having a normally open holding contact connected in parallel with said contact in the energizing circuit of the third relay and closed by energization of said third relay and a normally open battery control contact interposed in said second circuit and also closed by energization of said third relay so that said battery is connected in parallel with said rectifier only after said first relay has been energized to complete said first circuit between the rectifier and the electro-magnet, and a manually operable shut-off switch having a normally closed contact in series with said holding contact in said other alternative circuit for energizing said first relay so that opening of said normally closed contact of the shut-off switch causes deenergizing of said first relay to interrupt said first circuit and to effect successive deenergizing of said second and third relays for interrupting said second circuit.

2. In an electrical system for supplying current to a load-lifting magnet; the combination as in claim 1 further comprising a fourth relay, and circuit means for energizing said fourth relay from said source, said fourth relay having a normally open contact which is closed in response to energizing of said fourth relay and is interposed in said circuit for energizing said second relay so that the latter can be energized to initially complete the circuit for energizing said third relay only when current is being received from said source.

3. In an electrical system for supplying current to a load-lifting electromagnet; the combination as in claim 2 further comprising control means operative to connect said rectifier to the electromagnet with reversed polarity for only a predetermined period following a predetermined delay after actuation of said control means, and wherein said shut-off switch has a normally open contcat which is closed by operation of the shut-off switch and which is connected to said control means to actuate the latter.

4. In an electrical system for supplying current to a load-lifting electromagnet; the combination as in claim 3 wherein said control means includes an auxiliary relay, a circuit for energizing said auxiliary relay from said battery and having said normally open contact of the shut-off switch interposed therein, said auxiliary relay having a normally open holding contact closed by energization of said auxiliary relay and connected in parallel with said normally open contact of said shut-off switch, a timing relay with adjustable closing and releasing delays, a circuit for energizing said timing relay from said battery and having a normally open contact therein closed by energization of said auxiliary relay, a voltage reversing relay having normally open contacts connected in said first circuit to close and reverse the polarity of the voltage from said rectifier to the electromagnet in response to energizing of said voltage reversing relay, a circuit for energizing said voltage reversing relay from said battery and having a normally open contact therein which is closed by energizing of said timing relay, and a normally closed contact in said circuit for energizing said auxiliary relay which is opened by energizing of said voltage reversing relay to interrupt the operation of said control means at the conclusion of the releasing delay of said timing relay.

5. In an electrical system for supplying current to a load-lifting electromagnet; the combination as in claim 4 further comprising a normally closed contact interposed in said circuit for energizing said first relay and opened in response to energizing of said voltage reversing relay to disconnect said battery from the rectifier during the supplying of current with reversed polarity from the rectifier to the electromagnet.

6. In an electrical system for supplying current to a load-lifting electromagnet; the combination as in claim 2 further comprising a manually operable interrupter switch having two normally closed contacts operable in sequence and interposed in the circuits for energizing said second and third relays, respectively, to deenergize the latter, said second relay further having a normally open contact interposed between said source and said rectifier so that the flow of current to the electromagnet from both said battery and said rectifier is interrupted by actuation of said interrupter switch.

7. In an electrical system for supplying current to a load-lifting electromagnet; the combination as in claim 2 further comprising selector switching means movable to connect said battery to said rectifier for charging by the latter.

8. In an electrical system for supplying current to a load-lifting electromagnet; the combination as in claim 2 wherein said second relay further has a normally open contact interposed between said source and said rectifier to supply current to the latter only when said second relay is energized.

9. In an electrical system for supplying current to a load-lifting electromagnet; the combination as in claim 8 further comprising a battery-charging relay, a circuit for energizing said battery-charging relay from said source, selector switching means including first and second selector switches movable together between first and second operative positions, said first selector switch being interposed in said circuits for energizing said fourth relay and said battery charging relay, respectively, to energize said fourth relay and said battery charging relay in said first and second operative positions, respectively, of the first selector switch, said battery charging relay having a normally closed contact interposed in said circuit for energizing the third relay and a normally open contact interposed in said second circuit to respectively prevent energization of said third relay and to connect said battery to said rectifier for charging by the latter in response to energizing of said battery-charging relay, said second selector switch being interposed in said circuits for energizing said first, second and third relays from the battery when in said first operative position thereof and to interrupt said circuits when the second selector switch is in said second operative position, and an alternative circuit between said battery and said second relay closed by said second selector switch in said second operative position to energize said second relay for closing the contact between said source and rectifier to cause operation of the latter during charging of the battery.

10. In an electrical system for supplying current to a load-lifting electromagnet; the combination as in claim 9 further comprising a normally closed contact interposed in said circuit for energizing said battery charging relay and opened in response to energizing of said third relay, thereby to prevent energizing of said battery-charging relay while the battery is connected in parallel with the rectifier to supply current to the electromagnet.

11. In an electrical system for supplying current to a load-lifting electromagnet; the combination as in claim 10 further comprising automatic switching means operative to interrupt charging of the battery by the rectifier when the battery is fully charged.

References Cited in the file of this patent

UNITED STATES PATENTS

| | | |
|---|---|---|
| 2,080,504 | Raber | May 18, 1937 |
| 2,316,331 | Hedding | Apr. 13, 1943 |
| 2,501,681 | Kirkpatrick | Mar. 28, 1950 |
| 2,648,033 | Hudson | Aug. 4, 1953 |